C. A. MILLER.
WHEEL TIRE.
APPLICATION FILED MAR. 13, 1916.
1,212,380.
Patented Jan. 16, 1917.
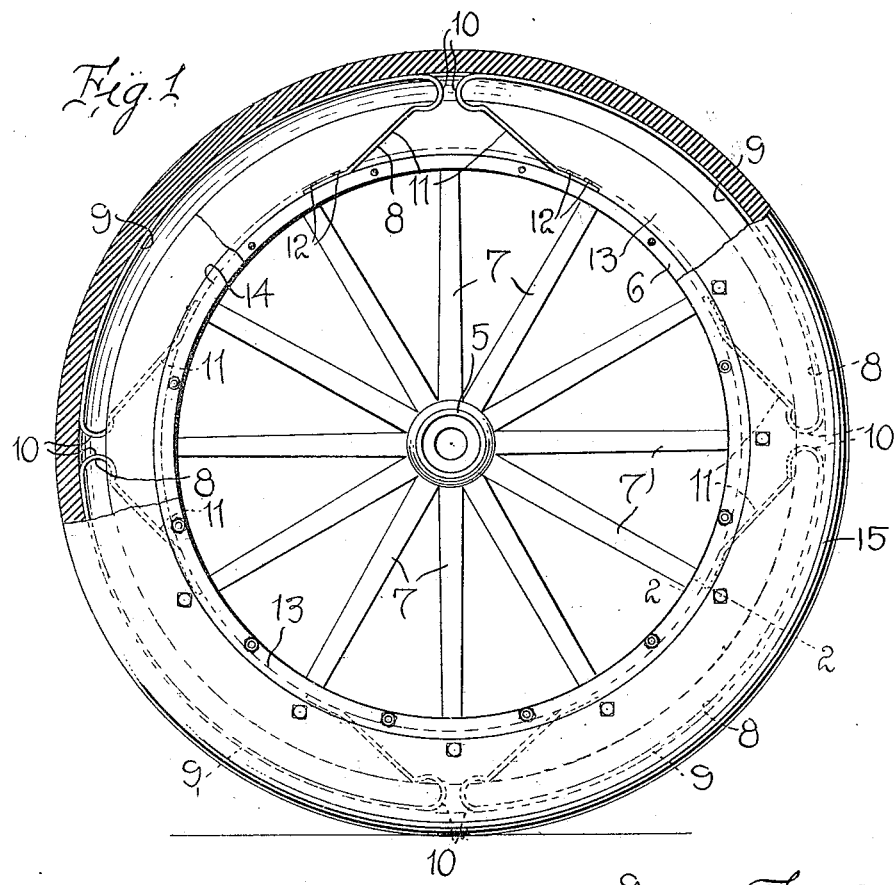
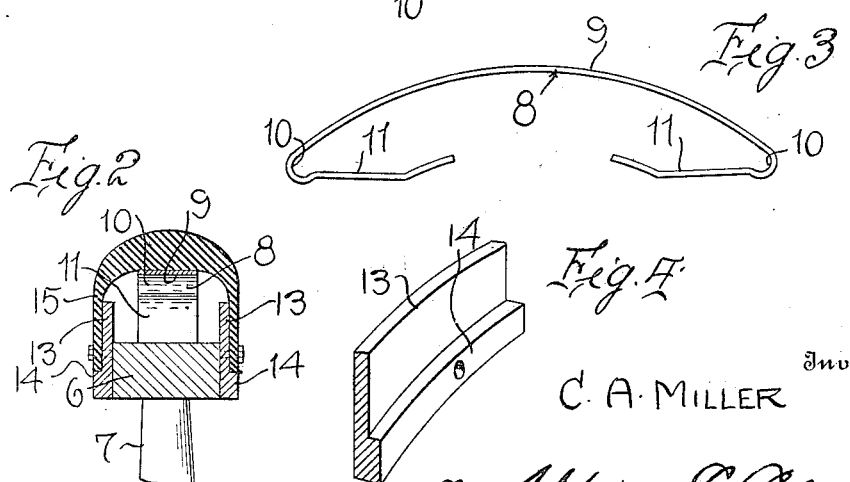
Inventor
C. A. MILLER
By Watson E. Coleman
Attorney

UNITED STATES PATENT OFFICE.

CHALMERS A. MILLER, OF MAPLETON, IOWA.

WHEEL-TIRE.

1,212,380. Specification of Letters Patent. Patented Jan. 16, 1917.

Application filed March 13, 1916. Serial No. 83,943.

*To all whom it may concern:*

Be it known that I, CHALMERS A. MILLER, a citizen of the United States, residing at Mapleton, in the county of Monona and State of Iowa, have invented certain new and useful Improvements in Wheel-Tires, of which the following is a specification, reference being had to the accompanying drawings.

This invention relates to wheel tires and has for its primary object to provide a simply constructed, resilient tire for the wheels of motor vehicles, which is not liable to puncture and which will also have a maximum of elasticity.

It is another object of the invention to provide a wheel tire of the above character embodying a plurality of long, circumferentially extending leaf springs having their end portions returned and normally inclined inwardly and fixed at their extremities to the rim of the wheel, and a flexible casing or sheath entirely enveloping said springs and secured to the opposite edges of the wheel rim.

It is a further object of the invention to provide means for effectually excluding dust from the interior of the tire, which consists in the provision of side plates secured to the opposite edges of the wheel rim and between which the obliquely extending end portions of the cushioning springs are movably disposed, and a flexible casing arranged upon the circumferentially disposed portions of the cushioning springs and secured at its edges to the fixed side plates.

It is a further general object of the invention to improve and simplify the construction of wheel tires for motor vehicles whereby the same are rendered extremely strong and durable, efficient and serviceable in practical use, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a side elevation with certain of the parts broken away, illustrating a wheel tire constructed in accordance with the preferred embodiment of my invention; Fig. 2 is an enlarged transverse sectional view taken on the line 2—2 of Fig. 1; Fig. 3 is an enlarged elevation of one of the cushioning springs; and Fig. 4 is a fragmentary perspective view of one of the side plates.

Referring in detail to the drawing, 5 designates the hub of the wheel which is connected to the rim 6 by means of a plurality of radially disposed spokes 7 suitably fixed at their ends in said hub and the rim respectively.

8 designates a plurality of cushioning springs, preferably four in number. Each of these springs is constructed from a single length of resilient steel having a medial, arcuately curved portion 9 disposed in concentric relation to the wheel rim. At the opposite ends of this medial portion 9 of the spring plate, said plate is formed with relatively small semi-circular bends 10, and from these bends in the plate the end portions thereof are obliquely extended inwardly, as at 11, said portions 11 terminating in angular extremities disposed initially in a direction toward the medial portion 9 of the spring and which are fixed by means of a plurality of bolts or rivets 12 to the rim of the wheel. It will be observed that the semi-circularly curved portions 10 of the adjacent cushioning springs are spaced apart for a sufficient distance to enable the springs to flex inwardly without contact or serious interference with each other.

To the opposite edges of the wheel rim 6, side plates 13 are securely bolted or fixed. The extended portions of the plates are preferably less in width than the normal distance between the wheel rim 6 and the medial portions 9 of the cushioning springs. Each of these side plates 13 is provided upon its outer face and contiguous to its inner edge with a longitudinally extending rib 14.

15 designates a casing or covering for the cushioning springs, which is made up of laminations of fabric and rubber as in the manner of the ordinary pneumatic tire casing, and the side portions of this casing 15 extend inwardly exteriorly of the plates 13 and have their edges riveted or otherwise fixed to the ribs 14 of said side plates.

In the practical operation of my improved wheel, it will be apparent that when the same is subjected to downward pressure by the wheel encountering an obstruction or entering a rut in the road surface, the springs 8 act to cushion all shocks or jars so that the same will not be transmitted to the vehicle body. In this cushioning action of the springs, the medial portions 9 thereof are forced inwardly against the action of the obliquely disposed end portions 11 of the spring plates which operate to distend or force the medial portions 9 thereof outwardly against the central portion of the inclosing casing 15. In this spring action, the side walls of the casing flex, but are immediately returned to a taut or stretched condition when the pressure upon the cushioning springs is relieved. It will be apparent that a nail or other sharp object which might penetrate the casing 15 will, upon encountering the steel cushioning springs 8, be deflected or broken. The penetration of such objects through the casing will have no effect whatever upon the cushioning action of the wheel tire which will continue to operate as serviceably and satisfactorily as before.

From the foregoing description, taken in connection with the accompanying drawing, the construction, manner of operation, and several advantages of my invention will be clearly and fully understood.

The device, while exceedingly simple, is nevertheless very effective and highly efficient for the purpose in view.

The tire can obviously be produced at comparatively small manufacturing cost and readily applied to the ordinary vehicle wheel of this character.

The size and proportions of the cushioning springs will, of course, be determined largely by the load capacity of the vehicle in connection with which the wheel is to be used, and these circumferentially extending cushioning springs may be increased or decreased in number as may be deemed advisable.

While I have shown and described the preferred construction and arrangement of the several elements of the device, it is to be understood that the same is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The combination with a vehicle wheel, of a tire therefor including a plurality of cushioning springs, each consisting of a resilient metal plate having an arcuately curved medial portion disposed in spaced concentric relation to the wheel rim, said plate at the opposite ends of such curved portion being provided with inwardly disposed semi-circular bends and the end portions of the plate being extended inwardly from said bends obliquely to the wheel rim and initially terminating in angular extremities disposed toward the medial portion of the spring and in the same general direction as the obliquely disposed end portions, said angular extremities being adapted to be fixed to said rim, and a flexible casing inclosing the said cushioning springs.

In testimony whereof I hereunto affix my signature in the presence of two witnesses.

CHALMERS A. MILLER.

Witnesses:
 Don. C. Lutz,
 T. B. Lutz.

Copies of this patent may be obtained for five cents each, by addressing the "Commissioner of Patents, Washington, D. C."